(12) United States Patent
Greco et al.

(10) Patent No.: US 11,994,659 B2
(45) Date of Patent: May 28, 2024

(54) MAGNIFYING DEVICE WITH MULTIPLE MAGNIFICATIONS

(71) Applicant: The Swatch Group Research and Development Ltd, Marin (CH)

(72) Inventors: Dario Greco, Winterthur (CH); Pierpasquale Tortora, Neuchâtel (CH); Michel Willemin, Prêles (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/893,773

(22) Filed: Aug. 23, 2022

(65) Prior Publication Data
US 2023/0125471 A1   Apr. 27, 2023

(30) Foreign Application Priority Data

Oct. 21, 2021   (EP) .................................... 21203857

(51) Int. Cl.
*G02B 15/06* (2006.01)
*G02B 15/10* (2006.01)

(52) U.S. Cl.
CPC ............ *G02B 15/06* (2013.01); *G02B 15/10* (2013.01)

(58) Field of Classification Search
CPC ................................ G02B 15/06; G02B 15/10
USPC .......................................................... 359/672
See application file for complete search history.

(56) References Cited

U.S. PATENT DOCUMENTS

| | | | | |
|---|---|---|---|---|
| 2,905,054 A | * | 9/1959 | Logan | G02B 25/008 359/818 |
| 3,753,611 A | | 8/1973 | Ebbesen | |
| 4,037,940 A | * | 7/1977 | Yates | G02B 25/008 359/813 |
| 5,610,668 A | * | 3/1997 | Mage | A61F 9/028 2/435 |
| 6,717,750 B2 | | 4/2004 | Knipping et al. | |
| 2009/0146050 A1 | * | 6/2009 | Roichman | G02B 21/32 250/216 |
| 2014/0078594 A1 | * | 3/2014 | Springer | G02B 7/16 359/821 |
| 2016/0062100 A1 | * | 3/2016 | Cohen | G02B 3/0006 348/79 |
| 2020/0374429 A1 | * | 11/2020 | Wu | G02B 3/0075 |

FOREIGN PATENT DOCUMENTS

| | | |
|---|---|---|
| JP | 55-32817 U | 3/1980 |
| JP | 11-326790 A | 11/1999 |
| JP | 2000-501203 A | 2/2000 |
| WO | 97/20248 A1 | 6/1997 |

OTHER PUBLICATIONS

Japanese Office Action dated May 16, 2023 in Japanese Application No. 2022-132363.
European Search Report for EP 21 20 3857 dated Mar. 28, 2022.

* cited by examiner

*Primary Examiner* — Sharrief I Broome
(74) *Attorney, Agent, or Firm* — Sughrue Mion, PLLC

(57) ABSTRACT

A magnifying device (100) with multiple magnifications including: an outer shell (10) forming a body of revolution with an axis of revolution (X-X) and having an inner cavity (5), a first lens (30) mounted at a first end (13) of said outer shell (10), and a second lens (20) capable of moving between a retracted position and an extended position in which said second lens (20) is superimposed on said first lens (30) so as to change the optical characteristics of the magnifying device (100).

15 Claims, 4 Drawing Sheets

MAGNIFYING DEVICE WITH MULTIPLE MAGNIFICATIONS

CROSS REFERENCE TO RELATED APPLICATIONS

This application claims priority to European Patent Application No. 21203857.4 filed Oct. 21, 2021.

TECHNICAL FIELD OF THE INVENTION

The field of the invention relates to the inspection, overhaul and maintenance of small parts, such as timepieces for example, and in particular to accessories for carrying out these inspection, overhaul and maintenance operations on small parts and timepieces.

More particularly, the invention relates to a magnifying device, such as a watchmaker's monocular magnifying glass, with multiple magnifications enabling components, for example horological components, of different orders of magnitude, to be observed with a single monocular magnifying glass.

TECHNOLOGICAL BACKGROUND

When inspecting, overhauling or maintaining timepieces, jewellery or small parts, magnifying devices are known to be used to observe components and small parts.

In the horological field, magnifying devices of the monocular type, also known as a watchmaker's eyeglass, are conventionally used.

These monocular magnifying glasses are very simple in design and consist of a hollow body, usually made of plastic, and a convex lens located at one end of the hollow body. The user can thus observe an element through the hollow body with a magnification effect that depends on the characteristics of the convex lens.

A large number of monocular magnifying glasses thus exist with different magnifications.

At present, in order to be able to make observations of different orders of magnitude, a plurality of monocular magnifying glasses with different magnifications must be used.

As an alternative, some manufacturers propose a monocular magnifying glass with interchangeable lenses so that the magnification of the monocular magnifying glass can be changed. Thus, using the same monocular magnifying glass, i.e. the same body, the user can benefit from two or more magnifications by exchanging the convex lens, for example by removing a retaining ring located at one end of the body.

However, this type of monocular magnifying glass lacks practicality. More specifically, the user must store the different lenses, and make sure that they are clean and stored well to avoid possible damage thereto. The various operations involving handling the lenses when successively assembling and removing them can also cause damage thereto.

Finally, this type of monocular magnifying glass involves assembly and removal operations that can be repeated many times during inspection, overhaul or maintenance operations, which is tedious and can be a source of annoyance for the user, who would generally prefer to have a set of several monocular magnifying glasses with different magnifications rather than having to carry out repetitive and tedious lens removal/assembly operations to adapt the magnification to his/her needs.

Another existing solution consists of superimposing a second lens on that of the monocular magnifying glass in order to change the magnification thereof by magnetisation elements (for example magnets) or quick-release fasteners such as clips, or clamps, etc., allowing the second lens to be momentarily attached to the body of the magnifying device.

However, this solution is also not satisfactory for the user, as the additional lenses can become detached from the body of the monocular magnifying glass during the various handling operations. Moreover, this solution also creates a risk of pollution and requires these additional lenses to be stored.

As a result, there is a need to facilitate inspection, overhaul and maintenance operations for timepieces, in particular when observations of different orders of magnitude are necessary.

SUMMARY OF THE INVENTION

In this context, the invention proposes a magnifying device with multiple magnifications comprising: an outer shell forming a body of revolution with an axis of revolution (X-X) and having an inner cavity, a first lens mounted at a first end of said outer shell, said magnifying device according to the invention further comprising a second lens capable of moving between a retracted position and an extended position in which said second lens is superimposed on said first lens so as to change the optical characteristics of the magnifying device.

In addition to the features mentioned in the preceding paragraph, the magnifying device according to the invention can have one or more complementary features from among the following, considered either on an individual basis or according to any combination technically possible:

- said second lens is integral with a moving carriage capable of being actuated by the user via a carriage guide rod;
- said second lens and said moving carriage are in one piece;
- said second lens is housed at said inner cavity of said outer shell in both the retracted and extended positions thereof;
- the magnifying device comprises elements configured to change the angular position of the moving carriage between the retracted position and the extended position of said second lens upon the displacement of the carriage guide rod by the user;
- said carriage guide rod slides in a set of guide rod guiding grooves formed in the thickness of the wall of said outer shell;
- said guide rod guiding grooves of said set are rectilinear;
- said carriage guide rod is made integral with the moving carriage by a guide pin forming a pivot link;
- said moving carriage comprises guide members cooperating with a set of carriage guiding grooves formed in the thickness of the wall of the outer shell, said set of carriage guiding grooves being configured to change the angular position of said moving carriage upon the displacement of said carriage guide rod by the user;
- said carriage guiding grooves of said set comprise a first rectilinear branch, a curved central portion and a second rectilinear branch;
- in the extended position, the second lens is concentric with the first lens and positioned at a distance d from said first lens;
- the first lens has a focal length f1 of 100 mm and the second lens has a focal length f2 of 27 mm;

the first lens is mounted at said first end of said outer shell by means of a removable retaining ring;

the outer shell is formed by two half-shells assembled and made integral with one another, preferably by bonding;

said magnifying device comprises a third lens capable of moving between a retracted position and an extended position in which said third lens is superimposed on said first lens and/or on said second lens so as to change the optical characteristics of the magnifying device;

said magnifying device comprises a ventilation slot to prevent said lenses from fogging up, and/or an aperture in the outer shell providing the user with a window for viewing without magnification.

Advantageously, the magnifying device is a monocular magnifying glass of the watchmaker's eyeglass type.

BRIEF DESCRIPTION OF THE FIGURES

The purposes, advantages and features of the present invention will be better understood upon reading the detailed description given below with reference to the following figures:

FIG. 3 shows a first state of the magnifying device in which the additional lens is retracted;

FIG. 5 shows a second state of the magnifying device in which the additional lens is extended;

In all figures, common elements bear the same reference numerals unless indicated otherwise.

DETAILED DESCRIPTION OF THE INVENTION

Figure 1:
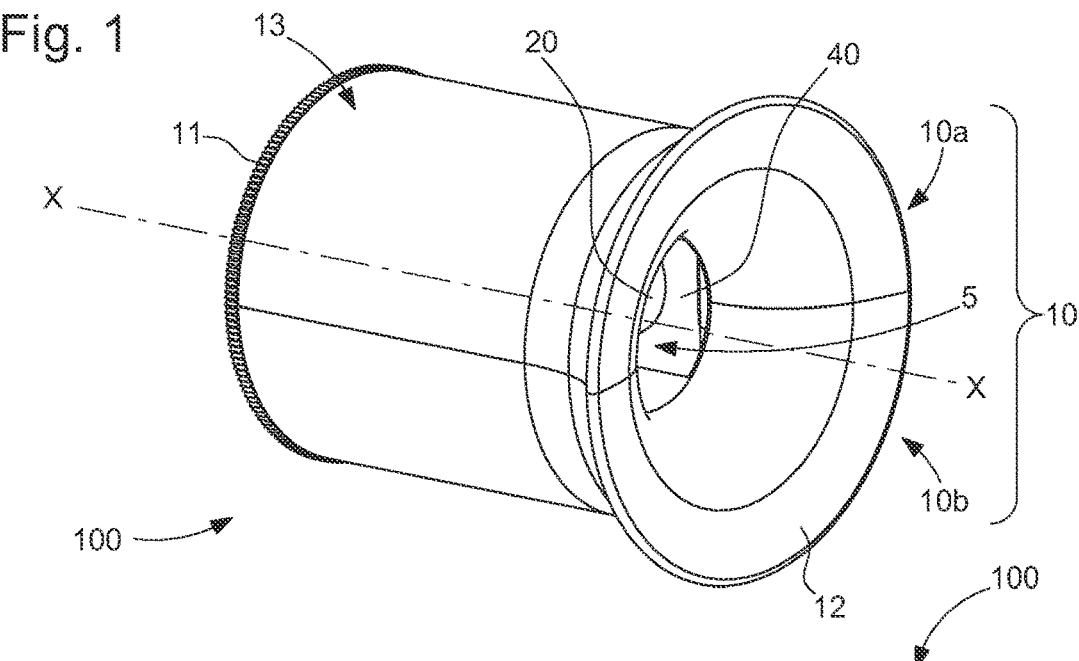
FIG. 1 diagrammatically shows a perspective view of an example embodiment of a magnifying device of the monocular type according to the invention.

FIG. 1 diagrammatically shows a perspective view of an example embodiment of a magnifying device 100 according to the invention.

Figure 2:
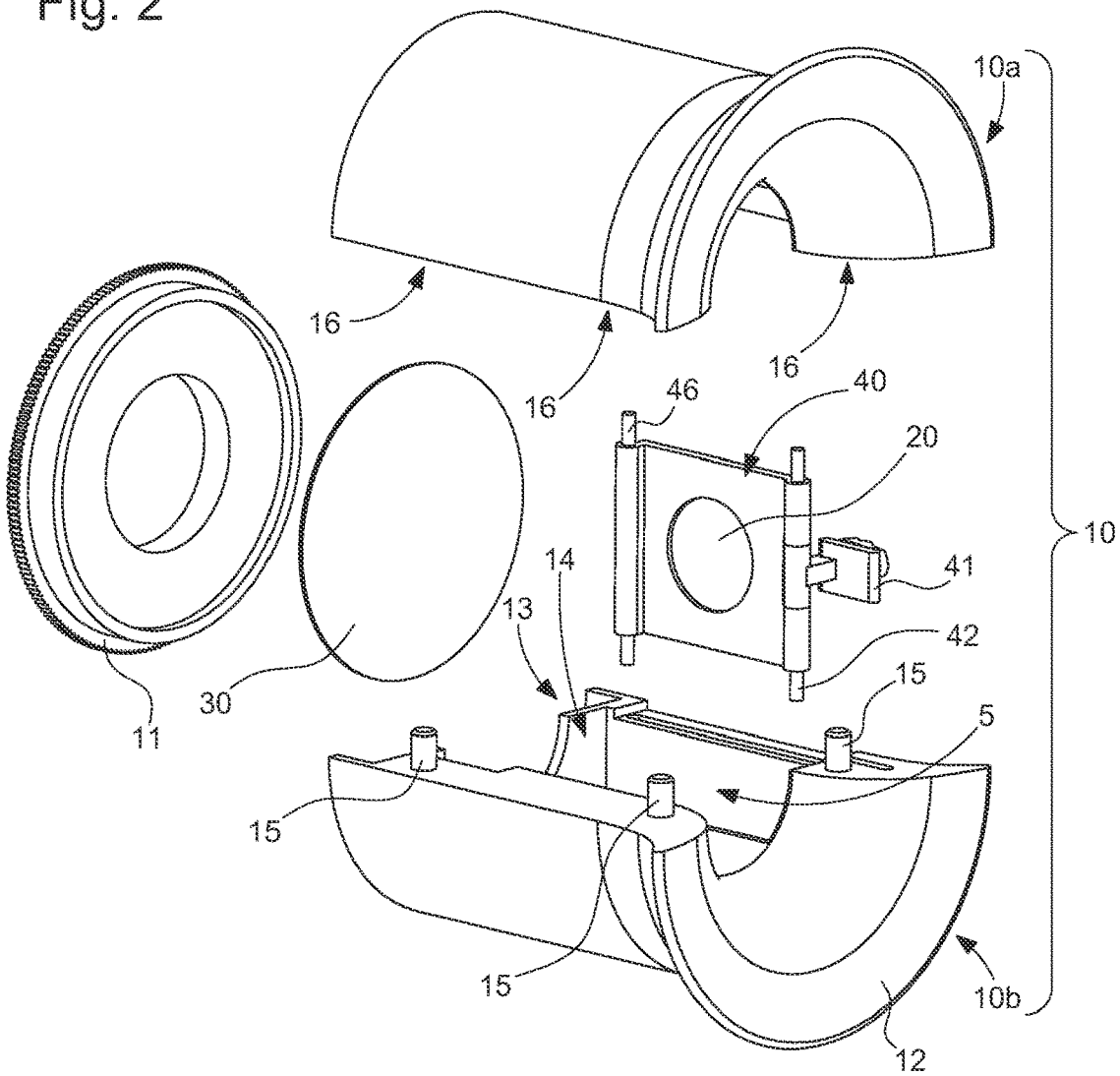
FIG. 2 diagrammatically shows an exploded view of the magnifying device, of the monocular type, shown in FIG. 1.

FIG. 2 diagrammatically shows an exploded view of the magnifying device 100 according to the invention. The exploded view thus allows the various elements constituting the magnifying device 100 according to the invention to be appraised.

Figure 3:
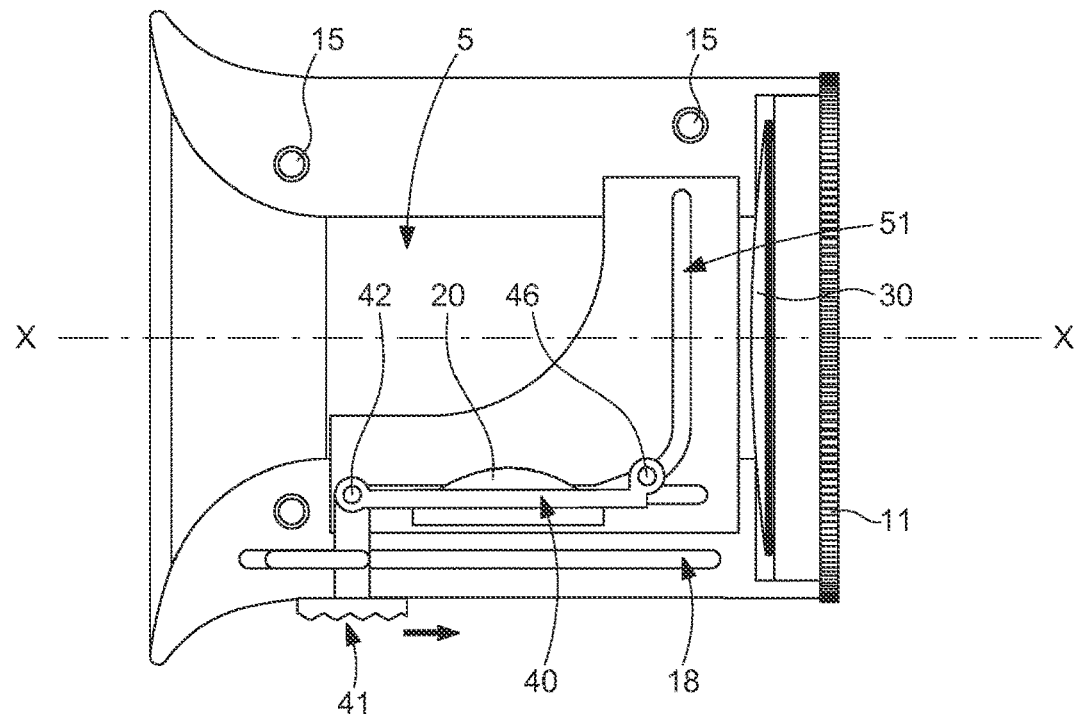
FIG. 3 is a partial side view of the magnifying device shown in FIG. 1 in which one half shell is not shown.

FIG. 3 is a partial side view of the magnifying device 100 according to the invention, in which one half shell of the outer shell is not shown; FIG. 3 thus shows a first state of the magnifying device in which the additional lens is retracted.

Figure 4:
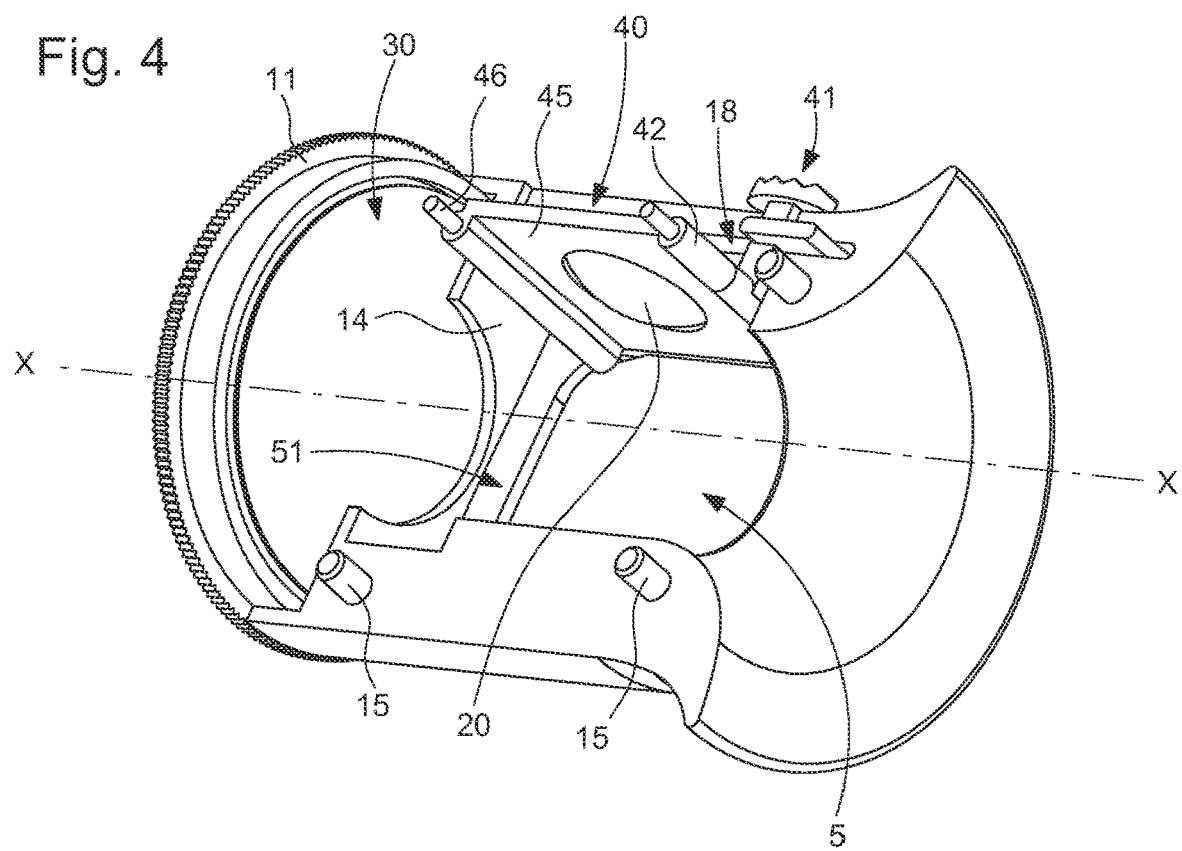
FIG. 4 is a perspective view of the magnifying device shown in FIG. 3.

FIG. 4 is a perspective view of the magnifying device shown in FIG. 3.

Figure 5:
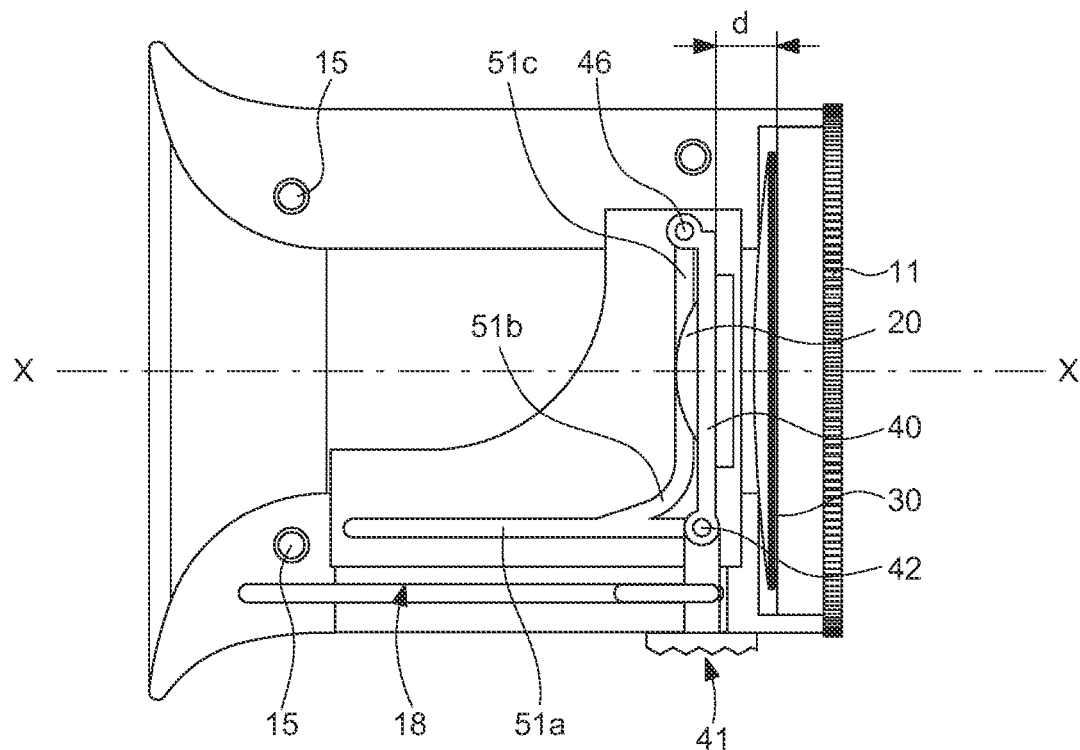
FIG. 5 is a partial side view of the magnifying device shown in FIG. 1 in which one half shell is not shown.

FIG. 5 is a partial side view of the magnifying device 100 according to the invention, in which one half shell of the outer shell is not shown; FIG. 5 thus shows a second state of the magnifying device in which the additional lens is extended.

Figure 6:
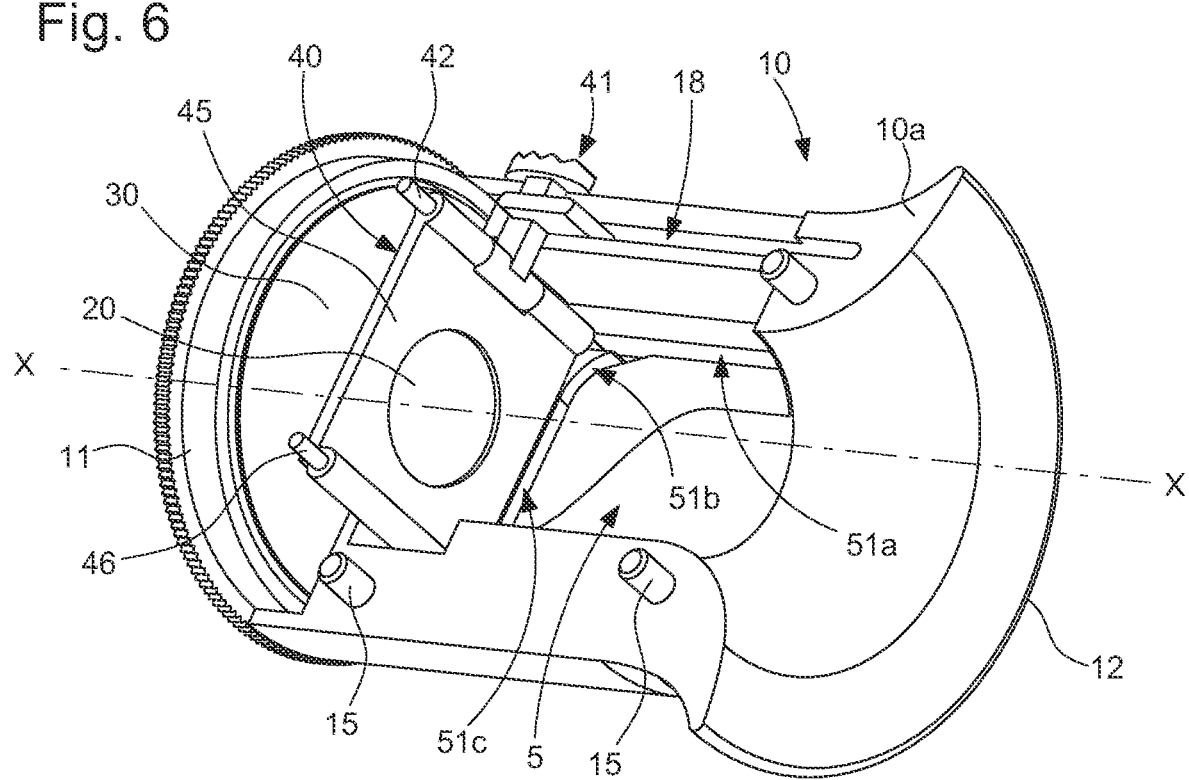
FIG. 6 is a perspective view of the magnifying device shown in FIG. 5.

FIG. 6 is a perspective view of the magnifying device shown in FIG. 5.

With reference to FIGS. 1 to 6, the magnifying device 100 is a monocular magnifying glass of the watchmaker's eyeglass type.

The magnifying device 100 comprises an outer shell 10 forming a hollow body of revolution with an axis of revolution X-X having an inner cavity 5 allowing the user to observe a small element or horological component through a magnifying lens.

Preferably, the outer shell 10 is formed by two half-shells 10a, 10b assembled and made integral with one another.

The two half-shells 10a, 10b are assembled to one another via assembling elements. The assembling elements consist of assembly pins 15, forming the male parts of the assembling elements, and of recesses 16 cooperating with the assembly pins 15, forming the female parts of the assembling elements, and which are formed in the half-shell facing that comprising the assembly pins 15.

In the example shown in FIG. 1 to 6, the assembly pins 15 (three whereof are shown by way of example) are provided on the same half-shell, in particular on the half-shell given the reference 10b, and the recesses 16 are provided on the other half-shell 10a positioned facing the former.

However, other embodiments are also possible without leaving the scope of the invention, in particular such as providing for distributing the assembly pins 15 and recesses on each of the two half-shells.

Preferably the two half-shells 10a, 10b are made integral with one another by bonding. Other methods of attachment are possible, such as clipping, or the use of a retainer sleeve for example. Heat welding is also possible depending on the materials used for the half-shells.

Preferably, the outer shell 10 is made of a polymer-based material, for example plastics material, a metal-based material, a ceramic-based material, a plant-based material such as wood or bamboo, or a mixture of several materials.

The outer shell 10 is, for example, produced by a three-dimensional printing or injection method.

In a conventional manner, the outer shell 10 forms the barrel of the magnifying device 100, allowing the user to view a small part or horological component through the outer shell 10.

The outer shell 10 comprises a first flared end 12 forming an interface adapted for positioning the magnifying device 100 in the region of the user's eye.

The outer shell 10 comprises a second end 13 carrying a first lens 30, referred to as the fixed lens. The first lens 30 is held in position at the second end 13 by a retaining ring 11.

The retaining ring 11 is advantageously a removable ring. The retaining ring 11 is, for example, a screwed ring which cooperates with a thread at the second end 13 of the outer shell 10.

The retaining ring 11 thus enables the first lens 30 to be held in position against an end plate 14 forming a receiving surface for the first lens 30.

The retaining ring 11 also serves to hold the two half-shells 10a, 10b together by exerting a clamping force thereagainst.

According to other alternative embodiments, the retaining ring 11 can also be a ring that is fitted onto the outer shell 10, for example by viscoelastic deformation of the ring, or by elastic fitting of the retaining ring 11 via elastic clips.

Such alternative embodiments are within the reach of a person skilled in the art without the need for further explanation.

The removable retaining ring 11 provides easy access to the first lens 30, for example for cleaning or replacement thereof where necessary.

For example, the retaining ring 11 is made of a polymer material or a metal material. By way of example, the retaining ring 11 can be made of plastics material or elastomer. The use of a metal ring 11 is preferred to give the magnifying device 100 a more upmarket finish.

In an alternative embodiment (not shown), it is also possible to not use such a removable retaining ring. In this case, the first lens 30 is positioned during the assembly of the two half-shells 10a, 10b, in two circular half-recesses provided for this purpose at the second end 13 of the outer shell 10, the two circular half-recesses being capable of holding the first lens 30 in position facing the optical path of the magnifying device 100 once the two half-shells 10a, 10b are assembled.

The first lens 30 is a convex lens. The first lens 30 is preferably a thin lens.

The first lens 30 has a first focal length f1 and a first magnification G1.

The magnifying device 100 according to the invention further comprises a second lens 20, referred to as the moving lens. The second lens is capable of moving between a retracted position and an extended position, or position of use, in which the second lens 20 is superimposed on the first lens so as to change the optical characteristics of the magnifying device 100, and in particular the magnification of the magnifying device 100. In the extended position, the optical axis of the second lens 20 is parallel to the axis of revolution of the magnifying device 100.

The second lens 20 is thus an additional lens that changes the optical characteristics of the magnifying device 100 at the user's request.

The second lens 20 is a convex lens. The second lens 20 is preferably a thin lens.

The second lens 20 has a second focal length f2 and a second magnification G2.

The second lens 20 is advantageously integrated and housed inside the structure of the outer shell 10, i.e. at the inner cavity 5, such that it is positioned and capable of moving within the outer shell 10.

Figure 9:
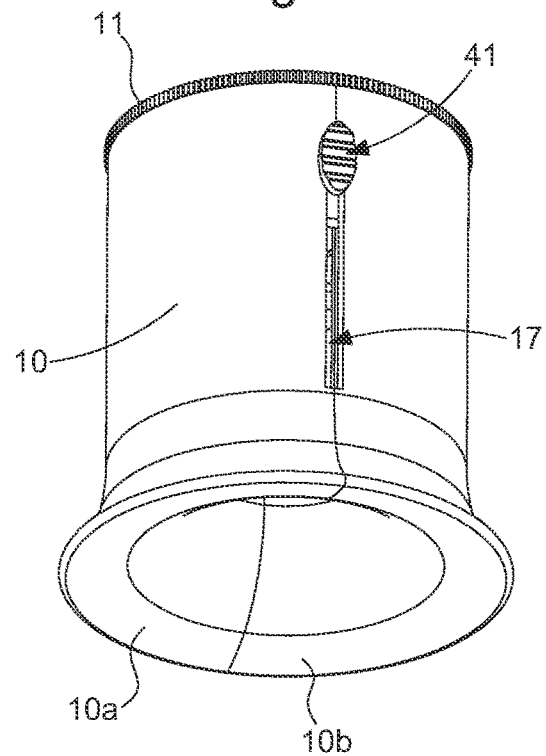
FIG. 9 is another perspective view of the example embodiment of a magnifying device shown in FIG. 1, illustrating a slot allowing a carriage guide rod to be actuated in order to extend or retract the additional lens.

The second lens 20 is integral with a moving carriage 40 which is capable of being actuated by the user via a carriage guide rod 41 comprising an interface portion that can be accessed from outside the magnifying device 100. The outer shell 10 comprises a slot 17 allowing the carriage guide rod 41 to slide. The slot 17 is more specifically shown in the view in FIG. 9.

The outer shell 10 has a set of guide rod guiding grooves 18, one guide rod guiding groove 18 being provided at each of the half shells 10a, 10b, and more particularly in the thickness of the wall of the outer shell 10. The guide rod guiding grooves 18 form slide-ways for the guiding and sliding of the carriage guide rod 41. The guide rod guiding grooves 18 are rectilinear and positioned facing one another.

Thus, under the action of the user, the carriage guide rod 41, and in particular the body of the carriage guide rod 41, is able to slide in the guide rod guiding grooves 18 between a first position, referred to as the non-activated position, in particular shown in FIGS. 3 and 4, in which the moving carriage 40 and the second lens 20 are retracted, and a second position, referred to as the activated position, shown in FIGS. 5 and 6, in which the moving carriage 40 and the second lens 20 are extended, positioning the second lens 20 parallel to and at a certain distance d from the first lens 30.

Thus, the magnifying device 100 comprises elements configured to change the angular position of the moving carriage 40 between the retracted position and the extended position upon the displacement of the carriage guide rod 41 by the user.

Figure 7:
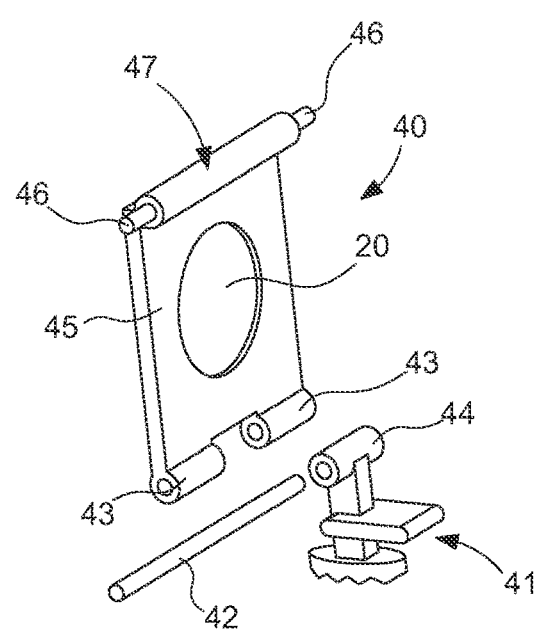
FIG. 7 is a perspective view of a moving carriage of the magnifying device according to the invention allowing the additional lens to be extended.

As shown in FIG. 7, which more particularly illustrates the moving carriage of the magnifying device 100 according to the invention allowing the additional lens to be extended, the moving carriage 40 comprises a plate 45 on which the second lens 20 is held securely, for example by fitting, bonding, etc.

The carriage guide rod 41 is integral with the moving carriage 40 at a first end of the plate 45 forming a pivot link of the hinge type with the carriage guide rod 41. The carriage guide rod 41 is made integral with the moving carriage 40 via a guide pin 42 which also forms a pivot pin.

At the first end of the plate 45 forming the junction with the carriage guide rod 41, the plate 45 comprises an even number of female knuckles 43 (two female knuckles 43 being shown in the example embodiment in FIG. 7) and the carriage guide rod 41 comprises an odd number of male knuckles, with a single male knuckle 44 being shown co-operating with the two female knuckles 43.

At the second end 47, the plate 45 has two guide pegs 46.

According to a first alternative embodiment, the guide pegs 46 are made in one piece with the plate 45.

According to a second alternative embodiment, the guide pegs 46 are formed by a guide pin which is independent of the plate 45 and which is inserted into a through-bore provided for this purpose at the end of the plate 45.

The ends of the guide pin 42 and the guide pegs 46 thus form guide members for guiding the moving carriage 40.

The guide members of the moving carriage 40 cooperate with a set of carriage guiding grooves 51, each half shell 10a, 10b having a carriage guiding groove 51.

The carriage guiding grooves 51 are curved grooves which allow the angular position of the moving carriage to be changed and at the same time allow it to be displaced when the carriage guide rod 41 and thus the first end of the plate 45 is displaced. According to the invention, the translational movements of the carriage guide rod 41 are transmitted to one end of the moving carriage 40 so as to allow it to tilt and rotate.

Typically, the carriage guiding grooves 51 have a first rectilinear branch 51a, a curved central portion 51b and a second rectilinear branch 51c.

Preferably, the first rectilinear branches 51a and the second rectilinear branches 51c extend in two perpendicular directions so as to allow the moving carriage 40 to pivot 90° between the retracted position and the extended position.

The first rectilinear branches 51a of the carriage guiding grooves 51 receive the ends of the guide pin 42 of the moving carriage 40. The first rectilinear branches 51a comprise a first end and a second end forming bankings limiting the displacements of the guide pin 42.

The curved central portions 51b and the second rectilinear branches 51c receive the guide pegs 46 of the second end of the plate 45 of the moving carriage 40.

The magnifying device 100 operates as follows: when the carriage guide rod 41 is in the non-activated position, the moving carriage 40 is in the retracted position. It is advantageously positioned inside a recess formed in the thickness of the peripheral wall of the outer body 10, such that in the retracted position, the moving carriage 40 and the second lens 20 are not in the path of the light rays and do not obstruct the field of vision. This position is shown in FIGS. 3 and 4.

In this position, the guide pin 42 abuts against a first end of the first rectilinear branch 51a, and more particularly against the end closest to the first flared end 12 of the outer shell 10.

In this position, the guide pegs 46 are in the lower part of the curved central portion 51b, i.e. close to the junction between the first rectilinear branch 51a and the curved central portion 51b, as shown in FIG. 3.

In this retracted position of the moving carriage 40, the optical axis of the second lens 20 is not aligned with the optical axis of the first lens 30. In this retracted position of the moving carriage 41, the optical axis of the second lens 20 is substantially perpendicular to the optical axis of the first lens 30.

In this retracted position of the moving carriage, the magnification of the magnifying device 100 corresponds to the magnification G1 of the first lens 30.

When the carriage guide rod 41 is used and caused to slide, in the direction of the arrow shown in FIG. 3, for example by moving the carriage guide rod 41 away from the first flared end 12 of the outer shell 10, the translation of the carriage guide rod 41 will allow the moving carriage 40 to rotate via the guide pegs 46 and the central curved portion 51b of the carriage guiding grooves 51 and to extend into the inner cavity of the outer shell 10.

When the moving carriage 40 is in the extended position, the guide pin 42 abuts against the second end of the first rectilinear branch 51a, and more particularly against the end located the furthest from the first flared end 12 of the outer shell 10.

In this position, the guide pegs 46 are close to or abut against the end of the second rectilinear portion 51c, as shown in FIG. 5.

When the moving carriage 40 is in the extended position, the moving carriage 40 and the second lens 20 are in the path of the light rays.

When the moving carriage 40 is in this extended position, the optical axis of the second lens 20 is parallel with the optical axis of the first lens 30, and preferably the optical axes of the two lenses are coincident and the lenses 20, 30 are concentric.

Thus, when the moving carriage 40 is in the extended position, the magnification of the magnifying device 100 is changed, and is preferably increased.

The distance d between the two lenses 20, 30 is configured by the positioning of the set of second guiding grooves 51 and in particular the position of the second rectilinear branch 51c relative to the first lens 30.

By way of example, with a first lens having a focal length f1 of 100 mm, the magnifying device has a magnification of 2.5×. With the second lens 20 having a focal length f2 of 27 mm extended such that it is added to the first lens 30, the magnification of the magnifying device becomes 15×. In this configuration, the distance d between the two lenses 20, 30 is 1.46 mm.

Advantageously, the magnifying device 100 according to the invention has dimensions that are relatively close to those of a conventional watchmaker's eyeglass with a single lens, such that the user will not be troubled by its use as a replacement for the conventional monocular magnifying glasses of the prior art.

According to one alternative embodiment of the invention, the moving carriage 40 and the second lens 20 form a one-piece unit, i.e. they are made from a single piece of the same material. In this case, the one-piece unit is advantageously a spherical lens with a rectangular section comprising, at a first end, the female knuckles 43 described hereinabove, and at a second end, the guide pegs 46 described hereinabove. The one-piece unit can thus be retracted and extended in the same way as the moving carriage described hereinabove.

Such an alternative embodiment in particular allows the number of parts to be minimised and the overall dimensions of the assembly formed by the moving carriage 40/second lens 20 to be reduced. With smaller overall dimensions, the user's field of view is maximised by increasing the diameter of the inner cavity 5 by reducing the thickness of the peripheral wall of the outer body 10, and thus the recess formed in the thickness of the peripheral wall of the outer body 10.

Such a one-piece unit can be made of glass, for example by machining, or of a polymer material, for example poly (methyl methacrylate) (PMMA), also known as plexiglas, or polycarbonate.

The magnifying device 100 according to the invention can also comprise a third lens which can be retracted in the same way as the second lens, so that four different magnification values can be obtained with one and the same magnifying device.

Figure 8:
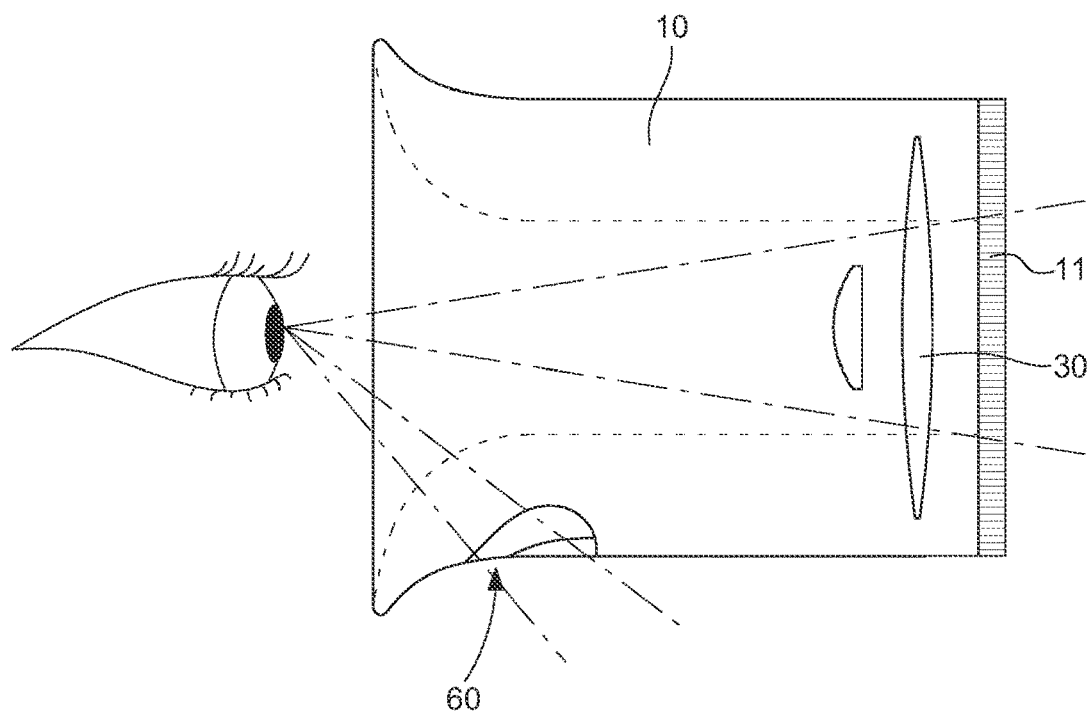
FIG. 8 is a diagrammatic view of an alternative embodiment of the magnifying device according to the invention.

As shown in FIG. 8, according to an alternative embodiment of the invention, the magnifying device 100 can additionally comprise a ventilation slot to prevent the various lenses of the magnifying device according to the invention from fogging up, or an aperture 60 to allow the user to view nearby elements without magnification and without having to remove the magnifying device 100.

The invention claimed is:

1. A magnifying device with multiple magnifications, comprising:
    an outer shell forming a body of revolution with an axis of revolution and having an inner cavity;
    a first lens mounted at a first end of said outer shell; and
    a second lens capable of moving between a retracted position and an extended position in which said second lens is superimposed on said first lens so as to change the optical characteristics of the magnifying device,
    wherein said second lens is integral with a moving carriage capable of being actuated by the user via a carriage guide rod.

2. The magnifying device with multiple magnifications according to claim 1, wherein said second lens and said moving carriage are in one piece.

3. The magnifying device with multiple magnifications according to claim 1, wherein said second lens is housed at said inner cavity of said outer shell in both the retracted and extended positions thereof.

4. The magnifying device with multiple magnifications according to claim 1, wherein the magnifying device comprises elements configured to change the angular position of the moving carriage between the retracted position and the extended position of said second lens upon the displacement of the carriage guide rod by the user.

5. The magnifying device with multiple magnifications according to claim 1, wherein said carriage guide rod slides in a set of guide rod guiding grooves formed in the thickness of the wall of said outer shell.

6. The magnifying device with multiple magnifications according to claim 5, wherein said set of guide rod guiding grooves rectilinear.

7. The magnifying device with multiple magnifications according to claim 4, wherein said carriage guide rod is made integral with the moving carriage by a guide pin forming a pivot link.

8. The magnifying device with multiple magnifications according to claim 4, wherein said moving carriage comprises guide members cooperating with a set of carriage guiding grooves formed in the thickness of the wall of the outer shell, said set of carriage guiding grooves being configured to change the angular position of said moving carriage upon the displacement of said carriage guide rod by the user.

9. The magnifying device with multiple magnifications according to claim 8, wherein said set of carriage guiding grooves comprise a first rectilinear branch, a curved central portion and a second rectilinear branch.

10. The magnifying device with multiple magnifications according to claim 1, wherein in the extended position, the second lens is concentric with the first lens and positioned at a distance d from said first lens.

11. The magnifying device with multiple magnifications according to claim 1, wherein the first lens has a focal length f1 of 100-mm and said second lens has a focal length f2 of 27-mm.

12. The magnifying device with multiple magnifications according to claim 1, wherein said first lens is mounted at said first end of said outer shell by means of a removable retaining ring.

13. The magnifying device with multiple magnifications according to claim 1, wherein said outer shell is formed by two half-shells assembled and made integral with one another.

14. The magnifying device with multiple magnifications according to claim 1, wherein said magnifying device comprises a third lens capable of moving between a retracted position and an extended position in which said third lens is superimposed on said first lens and/or on said second lens so as to change the optical characteristics of the magnifying device.

15. The magnifying device with multiple magnifications according to claim 1, wherein said magnifying device comprises a ventilation slot to prevent said lenses from fogging up, and/or an aperture in the outer shell providing the user with a window for viewing without magnification.

* * * * *